United States Patent
Leutgeb et al.

(10) Patent No.: US 9,231,661 B2
(45) Date of Patent: Jan. 5, 2016

(54) METHODS AND APPLIANCES FOR FORWARDING COMMUNICATION BETWEEN EXTERNAL APPLIANCES AND SECURE ELEMENTS USING AN INTERPOSED ELEMENT AND NEAR FIELD COMMUNICATION (NFC)

(71) Applicant: Infineon Technologies AG, Neubiberg (DE)

(72) Inventors: Thomas Leutgeb, Lieboch (AT); Walter Kargl, Graz (AT); Josef Riegebauer, Ilz (AT)

(73) Assignee: Infineon Technologies AG, Neubiberg (DE)

( * ) Notice: Subject to any disclaimer, the term of this patent is extended or adjusted under 35 U.S.C. 154(b) by 269 days.

(21) Appl. No.: 13/847,819

(22) Filed: Mar. 20, 2013

(65) Prior Publication Data
US 2013/0252545 A1 Sep. 26, 2013

(30) Foreign Application Priority Data

Mar. 21, 2012 (DE) .......................... 10 2012 102 383

(51) Int. Cl.
*H04B 5/00* (2006.01)
*H04W 12/00* (2009.01)
*H04W 4/00* (2009.01)

(52) U.S. Cl.
CPC ............. *H04B 5/0031* (2013.01); *H04W 12/00* (2013.01); *H04W 4/008* (2013.01)

(58) Field of Classification Search
None
See application file for complete search history.

(56) References Cited

U.S. PATENT DOCUMENTS

| | | | | |
|---|---|---|---|---|
| 4,816,653 | A * | 3/1989 | Anderl et al. ................ | 235/380 |
| 2009/0247078 | A1 | 10/2009 | Sklovsky et al. | |
| 2011/0130095 | A1* | 6/2011 | Naniyat et al. ............... | 455/41.1 |
| 2012/0178366 | A1* | 7/2012 | Levy et al. ................... | 455/41.1 |
| 2012/0252480 | A1* | 10/2012 | Krutt et al. .................. | 455/456.1 |
| 2013/0151400 | A1* | 6/2013 | Makhotin et al. ............. | 705/39 |

FOREIGN PATENT DOCUMENTS

| | | |
|---|---|---|
| CN | 1917387 A | 2/2007 |
| CN | 101501735 A | 8/2009 |
| CN | 102047748 A | 5/2011 |
| CN | 102064856 A | 5/2011 |
| CN | 102082590 A | 6/2011 |

* cited by examiner

*Primary Examiner* — Alejandro Rivero
(74) *Attorney, Agent, or Firm* — Murphy, Bilak & Homiller, PLLC

(57) ABSTRACT

A method for controlling the flow of data in a near field communication appliance having a plurality of secure elements is provided. The method includes receiving a first communication, sent by an external appliance, which is intended for an application located in one of a plurality of secure elements of the near field communication appliance. The method further includes determining which of the secure elements contains the application, and taking measures in order to ensure that a further communication exclusively between the external appliance and the secure element contains the addressed application. In addition, appropriate mobile terminals for NFC communication are disclosed.

16 Claims, 4 Drawing Sheets

180

METHODS AND APPLIANCES FOR FORWARDING COMMUNICATION BETWEEN EXTERNAL APPLIANCES AND SECURE ELEMENTS USING AN INTERPOSED ELEMENT AND NEAR FIELD COMMUNICATION (NFC)

PRIORITY CLAIM

This application claims priority to German Patent Application No. 10 2012 102 383.2, filed on 21 Mar. 2012, the content of said German application incorporated herein by reference in its entirety.

TECHNICAL FIELD

The invention relates to communication methods between electronic appliances, and particularly to the control of communication within an appliance which is used for near field communication, specifically in the 13.56 MHz band, and to appliances with accordingly controlled communication.

BACKGROUND

It is expected that mobile electronic appliances will be increasingly equipped with additional radio frequency (RF) communication functions. By way of example, this relates to mobile telephones, portable media players, smartphones, personal digital assistants (PDAs), handheld games consoles, tablet computers, laptop computers, etc. Besides their conventional functions, these appliances will thus be capable of performing additional communication functions. The range of applications for RF communication functions includes, in particular, contactless chip card functions, such as bookings, payments, purchases and the like, but also simple terminal-to-terminal communication initiated by the user, for example for the exchange of photographs, MP3 songs or business cards. Such additional RF communication functions are increasingly being implemented using what is known as near field communication (NFC) engineering.

NFC engineering is a wireless short range connectivity technique which allows simple and secure two-way interactions between electronic appliances. This allows consumers to perform contactless transactions, access digital content and connect electronic appliances or apparatuses. In other words, NFC engineering allows contactless, bidirectional communication between appliances. These elements may be mobile telephones, computers, consumer electronics, cards, tags, signs, posters, washing machines and the like which are equipped with NFC. An appliance equipped with NFC engineering can basically operate in a read/write, peer-to-peer or card emulation mode.

NFC engineering is standardized as a contactless technique in the 13.56 MHz frequency band. The ISO 14443 standard is a basic building block for a large part of the near field operations. NFC engineering is generally compatible with at least the type A and type B ISO 14443 standards. The components of an NFC session comprise initiators and targets. The initiator is the element which starts and manages the communication and the interchange of data. The target responds to requests from the initiator. A feature of NFC engineering is that elements can act either as an initiator or as a target. NFC engineering requires a dedicated RF chipset and an antenna to be integrated in the mobile element.

In a known configuration, the ISO 14443 standard is mapped in a mobile terminal onto a contact-based, transparent interface between, by way of example, an NFC frontend and a secure element, the secure element being in the form of a smartcard, for example. When physical proximity between the terminal and a contactless external terminal is set up, for example in order to make an electronic payment, RF communication is used to set up communication between the terminal and the mobile terminal. On the basis of the ISO 14443 standard, the communication between the wireless terminal and the secure element on which an application for handling the payment transaction is hosted is usually transparent in this case. This means that the NFC frontend as an interposed element passes the data stream through between the secure element (SE) and the external wireless terminal in both communication directions almost without alteration. In this case, mere decoding is not regarded as a break in the transparency so long as the transported information is not altered. This transparency is advantageous because, inter alia, it increases the communication speed as a result of absent intermediate steps in the NFC frontend, and also the security of the overall process.

It is to be expected that commercially available terminals, such as mobile telephones, will each increasingly be equipped with multiple secure elements, or at least the option of using multiple elements, in a foreseeable time. The reason for this, inter alia, is that there has been no internationally recognized industrial standard to date which provides a standard format for a secure element for the different market participants in the area of near field communication. By way of example, these include manufacturers of mobile terminals such as mobile telephones and tablet computers, etc., mobile radio providers, providers of payment systems, etc. The individual players have different channels and options for bringing the hardware of their payment systems to the customers. In the case of a mobile telephone manufacturer, this may be, by way of example, the installation of a complete near field communication system, including an NFC frontend and a permanently installed, i.e. soldered, for example, secure element. By contrast, the mobile radio provider is usually totally unable, or has only very limited ability, to influence the hardware of the terminal and will therefore provide a secure element, for example, in the form of or as a combination with a SIM card, which, as known from conventional mobile radio technology, the end user inserts into his mobile telephone, e.g. instead of his conventional previous SIM card without a secure element. A further option is a secure element in the form of a chip card (smartcard) or SD card, for example, which is inserted into a card slot in the terminal, that is to say in the mobile telephone, handheld computer or tablet computer, for example.

ISO standard 14443 defines the communication between a secure element and an NFC frontend. One way of providing, by way of example, a plurality of payment systems in a mobile terminal with near field communication capability, such as a mobile telephone, is to provide the relevant applications associated with the different payment systems on the same secure element (multi-application secure element). However, this provides only little flexibility insofar as, by way of example, the provider of a payment system may first need to come to an agreement with that market player which controls access to the secure element of the relevant terminal, for example a mobile radio provider in the case of a SIM card. Depending on the market structure and competition circumstances, this may be uneconomical, complicated or ultimately impossible for the provider of a payment system. Technical incompatibilities between the relevant applications and certain types of secure elements may be a further technical and economic obstacle.

Against this background, there is a need for methods and apparatuses which allow different applications for near field communication to be implemented in a terminal without being reliant on access to a particular secure element.

SUMMARY

A first exemplary embodiment of the invention relates to a method for controlling the flow of data in a near field communication appliance having an interposed element and a plurality of secure elements which are connected thereto in a transparent manner. The method comprises: receiving a first communication, sent by an external appliance, by the near field communication appliance; determining which of the secure elements contains an application suited to the first communication; and forwarding the first communication by means of the interposed element to the secure element which contains this application. The interposed element temporarily changes during the method from a transparent connection mode to a buffered connection mode with at least one of the secure elements.

A further exemplary embodiment relates to a near field communication appliance having an interposed element and at least two secure elements. The near field communication appliance is operable to receive a first communication, sent by an external appliance, which is intended for an application located in one of the at least two secure elements of the near field communication appliance. The near field communication appliance is also operable to determine which secure element contains this application, and to forward the first communication by means of the interposed element to the secure element which contains the addressed application. The interposed element is designed to temporarily change from a transparent connection mode to a buffered connection mode with at least one of the secure elements.

A further exemplary embodiment relates to a method for controlling the flow of data in a near field communication appliance having an interposed element and a plurality of secure elements which are connected thereto in a transparent manner. The method comprises: receiving data, sent by an external appliance, by the interposed element; transparently transmitting the data from the interposed element to a first secure element; and simultaneously decoding the data by the interposed element and scanning the decoded data by the interposed element in order to detect a piece of application selection information; using a detected piece of application selection information to determine which of the secure elements contains a suitable application; temporarily deactivating the transparency of the interposed element by means of buffer storage of the data in the interposed element; and forwarding the data based on the application selection information to the secure element with the suitable application.

Those skilled in the art will recognize additional features and advantages upon reading the following detailed description, and upon viewing the accompanying drawings.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts. In the drawings.

DETAILED DESCRIPTION

Figure 1:
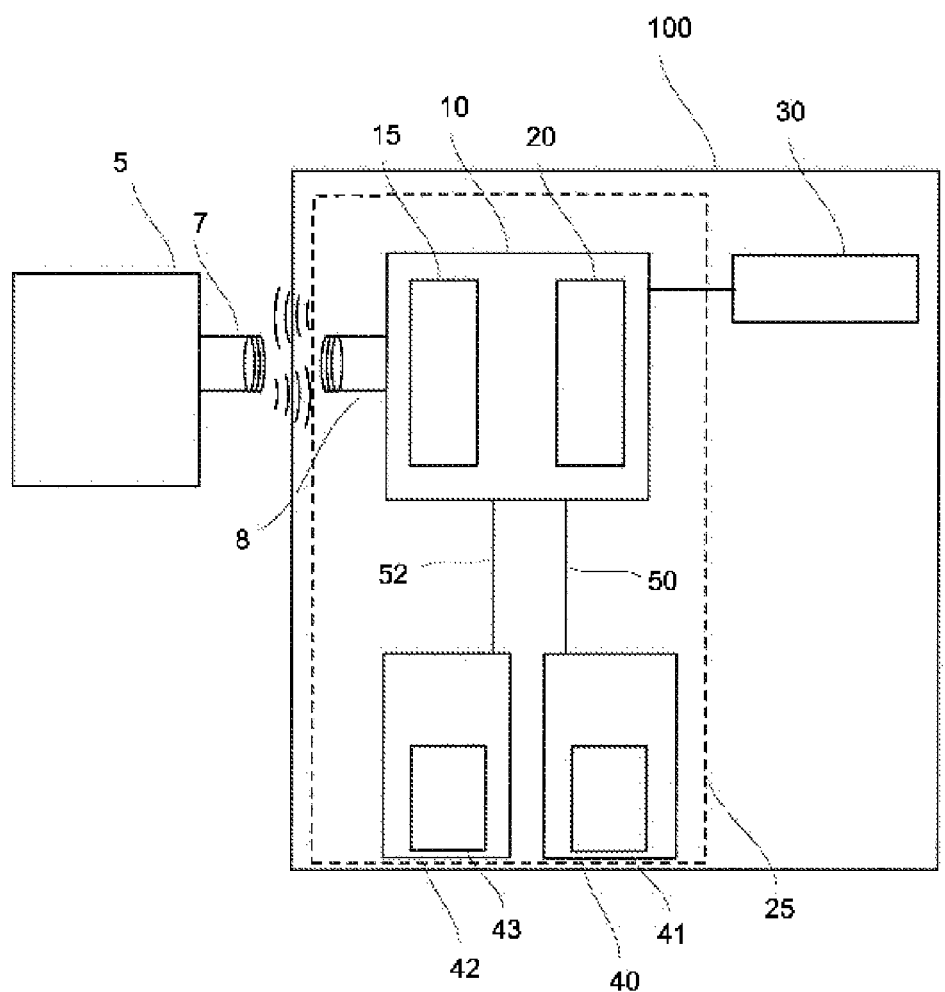
FIG. 1 shows a schematic illustration of a near field communication appliance which is incorporated in a terminal, based on embodiments of the invention, together with an external reader.

The text below describes various embodiments of the invention, some of which are also illustrated by way of example in the figures. In the description of the figures which follows, identical reference symbols relate to components which are the same or similar. In general, only differences between various embodiments are described. In this context, features which are described as part of one embodiment can also readily be combined in connection with other embodiments in order to produce yet further embodiments.

The term "transparency" or "transparent connection" used herein is defined as follows. Based on exemplary embodiments, an interposed element, which is an NFC frontend in one implementation, for example, is a bridge between an external NFC terminal and the secure elements incorporated in the NFC appliance according to the invention or else a host component. Transparency is thus intended to be understood to mean that the NFC frontend merely performs the conversion of the RF information (that is to say in the 13.56 MHz band, for example) into digital information. In this case, the data stream coded in the RF communication (e.g. based on the ISO 14443 standard) or the bit sequence that is coded in is merely converted from the RF signal by the NFC frontend, that is to say by means of analog-to-digital conversion. The resulting bit sequence is then forwarded to the transparently linked secure element without further alteration or significant delay, see below. This is what is intended to be understood by "transparency" or "transparent connection of interposed element and secure element" within the context of this specification.

An example of a break in the transparency is when the decoded bit stream is buffer-stored or buffered in the interposed element for a defined, significant period of time, for example, that is to say is essentially not forwarded in real time. In this case, one of the conditions surrounding whether or not the connection between the interposed element and a secure element can be regarded as transparent can be defined herein as follows: when the period of time for the delay between the reception of a first, RF-modulated bit by the interposed element and the forwarding of the bit is longer than the interval of time which is required for calculation based on the input bit rate for the transmission of a byte, the connection can no longer be regarded as transparent by definition. In other words, transparency is meant to involve the "residence time" of a bit in the interposed element being shorter than or no more than equal to a period of time which is equivalent based on the input data rate for transmitting a byte. In this context, significant changes in the bit sequence, for example as a result of a change in the coding method owing to decoding and subsequent recoding, are also deemed a break in the transparency. Short, systematic time delays, for example as a result of an interposed shift register in the digital path, are not considered to be a break in the transparency, on the other hand. In principle, a break in the transparency is indicated by all bit-oriented operations on the decoded data stream which go beyond the above.

Exemplary embodiments relate to a method for controlling the communication in an NFC terminal which comprises an NFC frontend and at least two secure elements. In this case, assurance is provided that a communication arriving from an external appliance, for example a contactless terminal, is answered as far as possible without or with a small time offset by precisely that secure element from the plurality of secure elements present which has the application suited to or associated with the incoming communication. It is thus possible to address an application in one or more secure elements regardless of whether one or more secure elements are connected in a transparent manner.

In this case, typically the standard transparency of the communication between the external appliance (that is to say a contactless NFC terminal, for example) and the NFC frontend with a secure element is interrupted at least for a short time, during which a decision or switch is made for the secure element to which the data stream of the incoming communication needs to be sent, and/or for the secure element which contains the application suited to the incoming communication and hence can be stipulated as the correct terminal point for the communication. At the same time, the methods and appliances described in exemplary embodiments can be used to ensure that in this case the break in the transparency cannot be detected by the external appliance in the RF range, that is to say that the course of the communication outwardly appears as if it were completely and consistently transparent.

Exemplary embodiments involve the NFC frontend (also: contactless frontend, CLF), in its operation as an interposed element (as a bridge or hub), intermittently changing over between the standard transparent mode and a buffered mode. In this case, an encoding/decoding unit in the NFC frontend begins in what is known as a "card emulation mode", also called passive mode, and then passes through the steps of the protocol activation layer based on the ISO 14443 standard, said standard being incorporated herein by reference in its entirety. The sequence for the protocol selection is regulated in ISO 14443-3. As soon as the appropriate application is identified in one of the secure elements, e.g. by the application identifier, the NFC frontend switches from the passive mode to the active mode in order to route the data from the incoming communication (first communication) to that secure element in which the identified application is hosted.

The aforementioned method can also be combined with methods for power management which are described further below. In this case, an NFC frontend typically controls the operating state of the connected secure elements, with the result that typically a time slot method involves only those secure elements with which communication is taking place or imminently being switched on.

FIG. 1 shows an apparatus based on exemplary embodiments. A terminal 100 with an NFC capability comprises an NFC appliance (near field communication appliance) 25 which has an NFC frontend 10 (also: contactless frontend, CLF, or NFC modem). This is an interposed element, as a bridge or hub, in the communication between an external NFC terminal/reader 5 and a plurality of secure elements 40, 42, at least one of which has or hosts an application. Each of the secure elements 40, 42 has a coding/decoding unit 41, 43 and is connected to the NFC frontend 10 by means of wired interfaces 50, 52.

In apparatuses based on exemplary embodiments, the NFC frontend 10 (also: contactless frontend, CLF, or NFC modem) is set up, in its operation as an interposed element 10, that is to say as a bridge or hub, to intermittently change over between the standard transparent mode and a buffered mode. FIG. 1 also shows further variants described herein for exemplary embodiments. In this case, ISO 14443 Layer 3 can be handled by the NFC frontend 10 in a first example. The two (in this nonlimiting example) secure elements 40, 42 are in this case set to the mode of the application layer. This can be accomplished either by virtue of the NFC frontend 10 issuing Layer 3 commands before the beginning of RF communication with the external terminal 5 or by virtue of fundamental configuration of the secure elements 40, 42 such that they automatically start at the level of the application layer. A Select AID (Select Application ID or: application selection information) command is then sent from the NFC frontend 10 to the secure elements 40, 42. The communication is then switched to the transparent mode again by means of the interfaces 50, 52, and the further communication proceeds transparently.

In one variant of this method, ISO 14443 Layer 3 is handled not by the NFC frontend 10 in FIG. 1 but rather by one of the secure elements 40, 42. This requires a secure element 40, 42 to collect all the information about the Layer 3 level from all the secure elements present (in this example just one more) before the communication with the external appliance/terminal 5 begins. Prior to the "Select AID" command, the NFC frontend 10 deactivates the interface 50, 52 to the secure elements 40, 42 in order to buffer or buffer-store the command. If the command "Select AID" addresses an application in one of the secure elements 40, 42, the NFC frontend 10 activates the interface 50, 52 again and forwards the command to the relevant secure element 40, 42. In principle, it is possible to carry out the method described here with almost any numbers of secure elements, for example 3, 5 or 10 secure elements.

Figure 4:
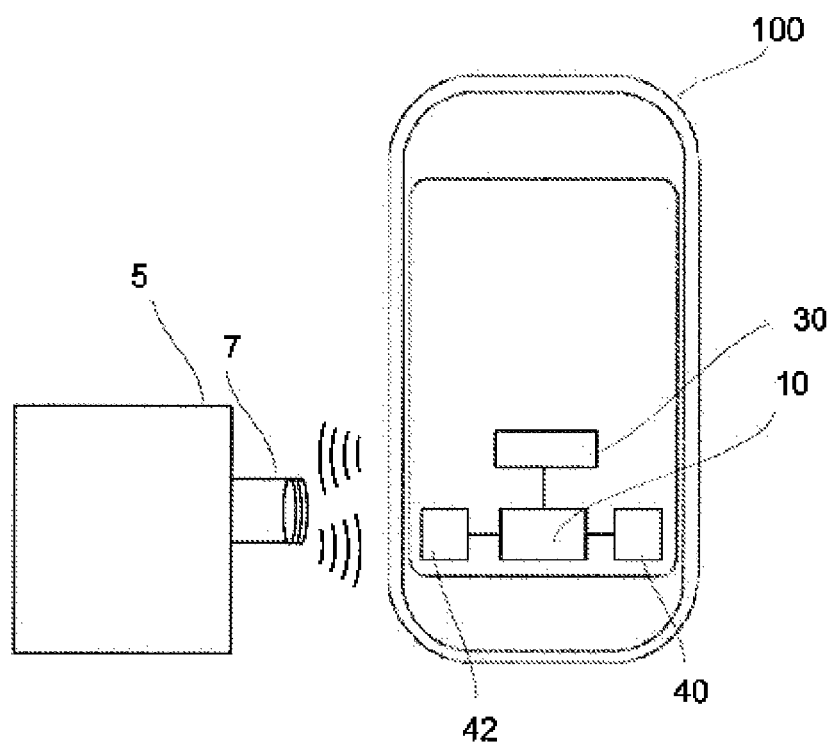
FIG. 4 schematically shows a terminal based on exemplary embodiments, together with an external reader.

Based on exemplary embodiments, the interposed element (NFC frontend) 10 with an analog RF interface 15 and an encoder/decoder unit 20 together with the secure elements 40, 42 in the form of a near field communication appliance 25 together with a host component 30 is part of a terminal 100 with an NFC capability (shown only schematically in FIG. 1, see also FIG. 4). The secure elements 40, 42 each comprise an encoder/decoder unit 41, 43. The terminal 100 may be based on a multiplicity of mobile or fixed terminals, as listed at the outset. By way of example, these include mobile telephones, portable media players, smartphones, personal digital assistants (PDAs), handheld games consoles, tablet computers, laptop computers, consumer electronics, cards, tags, signs, posters or household appliances. In this case, the host component 30 is representative and a simplified version of all control hardware and software which the terminals 100 contain besides the NFC-related part 25. FIG. 1 also shows an external terminal 5 or contactless reader which makes contact with the appliance via respective loop antennas 7, 8 based on embodiments.

Figure 2:
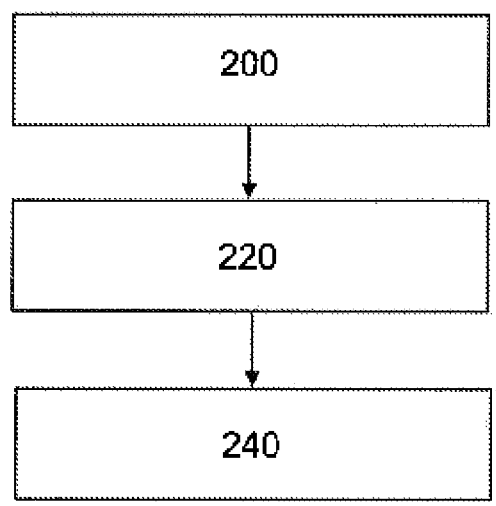
FIG. 2 schematically shows a method based on exemplary embodiments of the invention.

FIG. 2 schematically shows the processes of a method 180 based on exemplary embodiments which takes place in an appliance in FIG. 1. Based on the standard, the RF interface 15 (see FIG. 1) works transparently (block 200). In order to select the application in one of the secure elements 40, 42, the request ("Select AID") from the external appliance 5 is at least partially decoded and buffered or buffer-stored in the interposed element 10, that is to say typically the NFC frontend 10, and hence the transparency is interrupted (block 220). If the "Select AID" command is associated with a secure element 40, 42, the NFC frontend 10 forwards it thereto (block 240). Further communication between the external appliance 5 and the secure element 40, 42 then proceeds transparently again. To this end, the interposed element 10 typically contains information about the applications which are present in the secure elements 40, 42 of the near field communication appliance 100.

Figure 3:
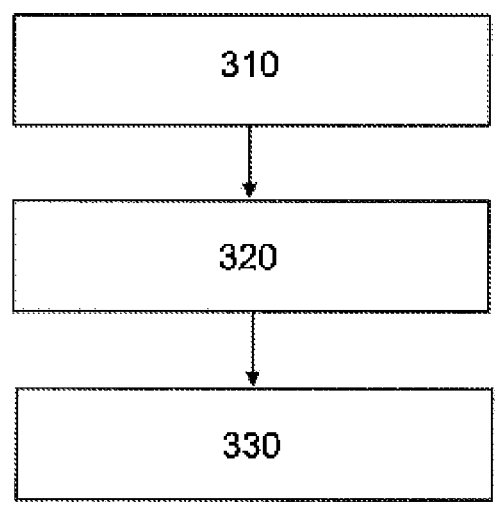
FIG. 3 schematically shows another method based on exemplary embodiments of the invention.

FIG. 3 shows a method 300 for controlling the flow of data in a near field communication appliance 25 having an interposed element 10 and a plurality of secure elements 40, 42 which are connected thereto based on exemplary embodiments. The method 300 comprises: receiving a first communication, sent by an external appliance, by the near field communication appliance (block 310); determining which of the secure elements 40, 42 contains an application suited to the first communication (block 320); and routing or forwarding the first communication by means of the interposed element 10 to the secure element 40, 42 which contains this application (in block 330). In this case, at least one portion of the first communication can be buffer-stored in the interposed element 10. In this case, the interposed element 10 changes temporarily from a transparent connection mode to a buffered connection mode with at least one of the secure elements 40, 42 during the method 300.

In exemplary embodiments, the above methods and appliances may also be combined with methods for power management. This means that a unit, in this case typically the NFC frontend 10, to which other appliances are connected, can be switched on and off in targeted fashion in order to control whether communication with these appliances is possible at a particular time. This consequently affords an elegant solution for simultaneously controlling the communication and lowering the power consumption by controlling the secure elements 40, 42 using an NFC frontend 10. Switching on in a time slot method thus makes it possible to ensure that only the secure element(s) 40, 42 which is/are currently required or actually communicating is/are ever on and consuming current, because they comprise the application which is addressed by the communication that is incoming from the external terminal. For power management, appropriate hardware and/or software means are typically implemented in the interposed element 10.

Since the induced current is limited, care should be taken to ensure that only the absolutely necessary number of elements is active. Based on timeout times, which may be different for different commands, the corresponding secure element 40, 42 can be made to change its power consumption. The NFC frontend 10 needs to take into account the timeout time in this case before a further secure element 40, 42 is activated. The NFC frontend 10 can also cut off the power supply for particular secure elements 40, 42 after particular timeouts if this secure element is no longer required.

FIG. 4 shows a mobile terminal 100, in this case a smartphone with a host component 30, which comprises a near field communication system according to ISO 14443 based on exemplary embodiments as shown in FIG. 1, which in this case is shown only schematically with the NFC frontend 10 and the secure elements 40, 42 connected thereto. In embodiments, the mobile terminal 100 may be, inter alia, a portable media player, a smartphone, a personal digital assistant (PDA), a handheld games console, a tablet computer, a smartcard or a personal computer, particularly a laptop, or another of the terminals mentioned in this specification. As in FIG. 1, the terminal 100 is shown communicating with an external reader 5.

A person skilled in the art will readily understand that not only can the method based on embodiments that is described herein be performed in the variants described in detail, it can also, in principle, be used for a multiplicity of applications. In particular, it is suitable for electronic appliances implemented based on a standard which are intended to have the standard data communication between appliances or elements sped up.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method for controlling flow of data in a near field communication (NFC) appliance having an interposed element and a plurality of secure elements connected to the interposed element in a transparent manner, the method comprising:
   receiving a first communication, sent by an external appliance, by the near field communication appliance;
   determining which of the secure elements contains an application suited to the first communication;
   forwarding the first communication by means of the interposed element to the secure element which contains the application; and
   temporarily changing the interposed element from a transparent connection mode, in which the interposed element converts the data from RF information to digital information and forwards the digital information in real time to the secure element which contains the application, to a buffered connection mode with at least one of the secure elements, in which the digital information is buffer-stored or buffered in the interposed element and not forwarded in real time to the secure element which contains the application.

2. The method of claim 1, further comprising buffering at least one portion of the first communication in the interposed element.

3. The method of claim 1, further comprising decoding at least partly the first communication by the interposed element.

4. The method of claim 1, wherein the interposed element comprises information about applications which are present in the secure elements.

5. The method of claim 1, wherein at least one of the secure elements has information about applications which are present in the secure elements.

6. The method of claim 1, wherein the forwarding of the first communication is followed by a further communication between the external appliance and the secure element transparently.

7. The method of claim 1, wherein the external appliance is a contactless NFC terminal and the near field communication appliance is included in a mobile terminal with an NFC function.

8. The method of claim 1, wherein the interposed element is an NFC frontend.

9. The method of claim 1, further comprising preventing data collisions between the secure elements by targeted power management implemented by the interposed element.

10. The method of claim 9, wherein the targeted power management implemented by the interposed element allows one of the secure elements to be intermittently switched off or placed in a quiescent state.

11. The method of claim 1, wherein the communication between the external appliance and the near field communication appliance takes place based on ISO 14443.

12. The method of claim 1, wherein in the buffered connection mode, a period of time for delay between reception of a first, RF-modulated bit by the interposed element and forwarding of the bit by means of the interposed element to the secure element which contains the application is longer than a period of time which is equivalent based on an input data rate for transmitting a byte.

13. A terminal, comprising:
a near field communication appliance, comprising:
   a plurality of secure elements; and
   an interposed element connected to the secure elements in a transparent manner, the interposed element being operable to temporarily change from a transparent connection mode to a buffered connection mode with at least one of the secure elements,
wherein the near field communication appliance is operable to:
   receive a first communication, sent by an external appliance, which is intended for an application located in one of the secure elements;
   determine which secure element contains the application; and
   forward the first communication by means of the interposed element to the secure element which contains the application,
wherein in the transparent connection mode, the interposed element converts received RF information to digital information and forwards the digital information in real time to the secure element which contains the application,
wherein in the buffered connection mode, the digital information is buffer-stored or buffered in the interposed element and not forwarded in real time to the secure element which contains the application.

14. The terminal of claim 13, wherein the terminal is a mobile terminal.

15. The terminal of claim 13, wherein the terminal is a mobile telephone, a portable media player, a smartphone, a personal digital assistant (PDA), a handheld games console, a tablet computer, a smartcard or a personal computer.

16. A method for controlling flow of data in a near field communication appliance having an interposed element and a plurality of secure elements connected to the interposed element in a transparent manner, the method comprising:
   receiving data, sent by an external appliance, by the interposed element;
   simultaneously transmitting the data from the interposed element to a first one of the secure elements in a transparent manner by the interposed element, and decoding the data by the interposed element;
   scanning the decoded data by the interposed element to detect a piece of application selection information;
   using the detected piece of application selection information to determine which of the secure elements contains a suitable application;
   temporarily deactivating the transparency of the interposed element by means of buffer storage of the data in the interposed element; and
   forwarding the data based on the application selection information to the secure element with the suitable application.

* * * * *